US011119611B2

(12) United States Patent
Ahn et al.

(10) Patent No.: US 11,119,611 B2
(45) Date of Patent: Sep. 14, 2021

(54) FILM TOUCH SENSOR FOR ENHANCING IMAGE QUALITY

(71) Applicant: DONGWOO FINE-CHEM CO., LTD., Jeollabuk-do (KR)

(72) Inventors: Gi Hwan Ahn, Chungcheongnam-do (KR); Seung June Park, Gyeonggi-do (KR)

(73) Assignee: Dongwoo Fine-Chern Co., Ltd., Iksan-Si (KR)

( * ) Notice: Subject to any disclaimer, the term of this patent is extended or adjusted under 35 U.S.C. 154(b) by 0 days.

(21) Appl. No.: 16/319,097

(22) PCT Filed: Jul. 17, 2017

(86) PCT No.: PCT/KR2017/007625
§ 371 (c)(1),
(2) Date: Jan. 18, 2019

(87) PCT Pub. No.: WO2018/016811
PCT Pub. Date: Jan. 25, 2018

(65) Prior Publication Data
US 2019/0384428 A1 Dec. 19, 2019

(30) Foreign Application Priority Data
Jul. 21, 2016 (KR) .................. 10-2016-0092804

(51) Int. Cl.
*G06F 3/044* (2006.01)
*G06F 3/041* (2006.01)
(52) U.S. Cl.
CPC ............ *G06F 3/044* (2013.01); *G06F 3/0418* (2013.01)

(58) Field of Classification Search
CPC ........ G06F 3/0443; G06F 3/044; G06F 3/041; G06F 3/0446; G06F 3/0418; G06F 2203/04103; G06F 2203/04111
See application file for complete search history.

(56) References Cited

U.S. PATENT DOCUMENTS

2010/0245725 A1* 9/2010 Kaihoko ........... G02F 1/133528
349/96
2012/0113021 A1 5/2012 Liu et al.
(Continued)

FOREIGN PATENT DOCUMENTS

| CN | 104395867 A | 3/2015 |
| CN | 104536615 A | 4/2015 |

(Continued)

OTHER PUBLICATIONS

First Office Action from corresponding Taiwanese Patent Appln. No. 106124266 dated Jan. 18, 2018, and its English translation.

*Primary Examiner* — Kwang-Su Yang
(74) *Attorney, Agent, or Firm* — DLA Piper LLP (US)

(57) ABSTRACT

The present invention relates to a film touch sensor comprising a separation layer; a first protection layer that is formed on the separation layer; a touch detection layer that is formed on the first protection layer; a second protection layer that is formed on the touch detection layer; and an optical compensation layer that is formed between the first protection layer and the touch detection layer, or between the touch detection layer and the second protection layer, and that compensates for a transmittance difference between the patterned region in which a transparent electrode pattern forming the touch detection layer is formed, and a non-patterned region in which the transparent electrode pattern is not formed.

11 Claims, 7 Drawing Sheets

(56) References Cited

U.S. PATENT DOCUMENTS

| | | | |
|---|---|---|---|
| 2014/0071637 A1 | 3/2014 | Hsu et al. | |
| 2014/0313440 A1* | 10/2014 | Hsu | G06F 3/044 349/12 |
| 2015/0109252 A1 | 4/2015 | Kanna et al. | |
| 2016/0085100 A1* | 3/2016 | Toyoshima | G02F 1/13363 349/12 |
| 2016/0299630 A1* | 10/2016 | Park | G06F 3/044 |

FOREIGN PATENT DOCUMENTS

| | | |
|---|---|---|
| JP | 2014-0135938 | 7/2014 |
| KR | 10-2008-0004082 | 1/2008 |
| KR | 10-2009-0062162 | 7/2009 |
| KR | 10-2012-0053652 | 5/2012 |
| KR | 10-2013-0141669 | 11/2013 |
| KR | 10-2014-0030162 | 3/2014 |
| TW | 201411661 A | 3/2014 |
| TW | 201543299 A | 11/2015 |

\* cited by examiner

FILM TOUCH SENSOR FOR ENHANCING IMAGE QUALITY

TECHNICAL FIELD

The present invention relates to a film touch sensor. More particularly, the present invention relates to a film touch sensor which compensates the difference in the transmittance between the patterned region and the non-patterned region which constitute a touch sensing layer, thereby preventing a phenomenon wherein a patterned region and a non-patterned region are distinguishably recognized, and capable of enhancing the optical transmittance through the patterned region, thereby enhancing the image quality.

BACKGROUND ART

Touch sensor is a device for recognizing touch point in response to a contact when a user contacts an image displayed on a screen with a finger or a touch pen or the like, and manufactured in a structure to be mounted on a liquid crystal display (LCD), an organic light-emitting diode (OLED), and the like.

Generally, in a touch sensor, a touch sensing layer including transparent electrode patterns formed in a mutually crossed direction is provided as an element for sensing the user's touch motion, and this touch sensing layer can be divided into a patterned region and a non-patterned region depending on whether the transparent electrode patterns exist or not.

Since the light transmittance passing through such a patterned region and a non-patterned region is different from each other, the problem occurs that the patterned region and the non-patterned region are distinguishably recognized from each other.

In addition, a problem occurs that the image quality is degraded because the transmittance of the patterned region is relatively lower when compared to that of the non-patterned region.

LEADING TECHNICAL LITERATURES

Patent Literature a. [Patent Literature 1] Korea Patent Publication No. 10-2013-0129625 (Publication date: Nov. 29, 2013, Title: Transparent conductive film with a hybrid under coating layer and method for manufacturing thereof, touch panel using the same)
b. [Patent Literature 2] Korea Patent Publication No. 10-2015-0107969 (Publication date: Sep. 24, 2015, Title: High refractive anti-static hard-coating film for transparent electrode)

DISCLOSURE OF INVENTION

Technical Problem

A technical objective of the present invention is to provide a film touch sensor capable of compensating the difference in the transmittance between a patterned region and a non-patterned region which constitute a touch sensing layer so as to prevent a phenomenon wherein the patterned region and the non-patterned region are distinguishably recognized.

In addition, another technical objective of the present invention is to provide a film touch sensor capable of enhancing the optical transmittance through a patterned region of a touch sensing layer, thereby enhancing the image quality.

Solution to Problem

In order to solve the above-described problem, the touch sensor according to the present invention comprises: a separation layer; a first protection layer formed on the separation layer; a touch sensing layer formed on the first protection layer; a second protection layer formed on the touch sensing layer; and an optical compensation layer formed between the first protection layer and the touch sensing layer or between the touch sensing layer and the second protection layer, compensating the difference in the transmittance between the patterned region wherein a transparent electrode pattern constituting the touch sensing layer is formed and the non-patterned region wherein the transparent electrode pattern is not formed.

In a film touch sensor according to the present invention, it is characterized in that the thickness of the patterned region is in the range of 300 Å to 600 Å, and the thickness ratio between the patterned region and the optical compensation layer (thickness of patterned region/thickness of optical compensation layer) is equal or greater than 0.3 but equal or less than 0.8.

In a film touch sensor according to the present invention, it is characterized in that the thickness of the patterned region is in the range of 1100 Å to 1500 Å, and the thickness ratio between the optical compensation layer and the patterned region (thickness of optical compensation layer/thickness of patterned region) is equal or greater than 0.07 but equal or less than 0.7.

In a film touch sensor according to the present invention, it is characterized in that the refractive index of the optical compensation layer is greater than the refractive index of the first protection layer but equal or less than the refractive index of the transparent electrode pattern.

In a film touch sensor according to the present invention, it is characterized in that the refractive index of the optical compensation layer is equal or greater than 1.6 but equal or less than 2.1.

In a film touch sensor according to the present invention, it is characterized in that the refractive index of the optical compensation layer is equal or greater than 1.6 but equal or less than 1.9.

In a film touch sensor according to the present invention, it is characterized in that the optical compensation layer comprises an inorganic insulating membrane.

In a film touch sensor according to the present invention, it is characterized in that the optical compensation layer comprises at least one selected from the group comprising $Al_2O_3$, $MgO$, $NdF_3$, $SiO_N$, $Y_2O_3$, $ZnO$, $TiO_2$, $ZrO_2$ and $Nb_2O_5$.

In a film touch sensor according to the present invention, it is characterized in that the optical compensation layer comprises an organic insulating membrane.

In a film touch sensor according to the present invention, it is characterized in that the optical compensation layer comprises an organic material containing inorganic fine particles.

In a film touch sensor according to the present invention, it is characterized in that the content of the inorganic fine particles is equal or greater than 40 wt % but equal or less than 95 wt % with respect to the total weight of the optical compensation layer.

In a film touch sensor according to the present invention, it is characterized in that the organic material comprises at least one selected from the group comprising acrylic resin, urethane resin, melamine resin, alkyd resin, siloxane polymer, organic silane condensate.

In a film touch sensor according to the present invention, it is characterized in that the inorganic fine particles comprises at least one selected from the group comprising $Al_2O_3$, $MgO$, $NdF_3$, $SiO_N$, $Y_2O_3$, $ZnO$, $TiO_2$, $ZrO_2$ and $Nb_2O_5$.

In a film touch sensor according to the present invention, it is characterized in that the refractive index of the optical compensation layer is adjusted by controlling the content of the inorganic fine particles.

In a film touch sensor according to the present invention, it is characterized in that the average diameter of the distributed inorganic particle is equal or greater than 10 nm but equal or less than 200 nm.

In a film touch sensor according to the first aspect of the present invention, the optical compensation layer comprises: a first transparent electrode pattern formed on the first protection layer wherein the touch sensing layer is formed on the optical compensation layer so as to be connected to each other along a first direction; a second transparent electrode pattern formed on the optical compensation layer so as to be separated from each other along a second direction which is crossed with the first direction; an insulating portion formed on the entire surface of the first transparent electrode pattern, the second transparent electrode pattern and the optical compensation layer, insulating the first transparent electrode pattern from the second transparent electrode pattern; and a bridge pattern formed on the insulating portion between the contact holes formed on the insulating portion in a way that portions of the adjacent second sensing electrode patterns are exposed, electrically connecting the adjacent second transparent electrode patterns.

In a film touch sensor according to the second aspect of the present invention, the optical compensation layer comprises: a first transparent electrode pattern formed on the touch sensing layer wherein the touch sensing layer is formed on the first protection layer so as to be connected to each other along a first direction; a second transparent electrode pattern formed on the first protection layer so as to be separated from each other along a second direction which is crossed with the first direction; an insulating portion formed on the entire surface of the first transparent electrode pattern, the second transparent electrode pattern and the first protection layer, insulating the first transparent electrode pattern from the second transparent electrode pattern; and a bridge pattern formed on the insulating portion between the contact holes formed on the insulating portion in a way that portions of the adjacent second sensing electrode patterns are exposed, electrically connecting the adjacent second transparent electrode patterns.

In a film touch sensor according to the third aspect of the present invention, the optical compensation layer comprises: a first transparent electrode pattern formed on the first protection layer wherein the touch sensing layer is formed on the optical compensation layer so as to be connected to each other along a first direction; a second transparent electrode pattern formed on the optical compensation layer so as to be separated from each other along a second direction which is crossed with the first direction; an insulating portion formed on the entire surface of the first transparent electrode pattern, and on the optical compensation layer exposed between the first sensing electrode pattern and the second transparent electrode pattern, insulating the first transparent electrode pattern from the second transparent electrode pattern; and a bridge pattern formed on the insulating portion so as to be contacted to the adjacent second transparent electrode patterns, electrically connecting the adjacent second transparent electrode patterns.

In a film touch sensor according to the fourth aspect of the present invention, the optical compensation layer comprises: a first transparent electrode pattern formed on the touch sensing layer wherein the touch sensing layer is formed on the first protection layer so as to be connected to each other along a first direction; a second transparent electrode pattern formed on the first protection layer so as to be separated from each other along a second direction which is crossed with the first direction; an insulating portion formed on the entire surface of the first transparent electrode pattern, and on the first protection layer exposed between the first sensing electrode pattern and the second transparent electrode pattern, insulating the first transparent electrode pattern from the second transparent electrode pattern; and a bridge pattern formed on the insulating portion so as to be contacted to the adjacent second transparent electrode patterns, electrically connecting the adjacent second transparent electrode patterns.

In a film touch sensor according to the fifth aspect of the present invention, the optical compensation layer comprises: a bridge pattern formed on the first protection layer wherein the touch sensing layer is formed on the optical compensation layer; an insulating portion formed on the bridge pattern in a way that a portion of the bridge pattern is exposed; a first transparent electrode pattern formed on the insulating layer so as to be connected to each other along the a first direction; and a second transparent electrode pattern formed on the exposed region of the bridge pattern and the optical compensation layer along a second direction which is crossed with the first direction, wherein the adjacent second transparent electrode patterns are electrically connected with the bridge pattern as an intermediate.

In a film touch sensor according to the sixth aspect of the present invention, the optical compensation layer comprises: a bridge pattern formed on the touch sensing layer wherein the touch sensing layer is formed on the first protection layer; an insulating portion formed on the bridge pattern in a way that a portion of the bridge pattern is exposed; a first transparent electrode pattern formed on the insulating layer so as to be connected to each other along the a first direction; and a second transparent electrode pattern formed on the exposed region of the bridge pattern and the first protection layer along a second direction which is crossed with the first direction, wherein the adjacent second transparent electrode patterns are electrically connected with the bridge pattern as an intermediate.

Advantageous Effects of Invention

According to the present invention, there is an effect of providing a film touch sensor capable of compensating the difference in the transmittance between a patterned region and a non-patterned region which constitute a touch sensing layer so as to prevent a phenomenon wherein these regions are distinguishably recognized.

In addition, there is an effect of providing a film touch sensor capable of enhancing the optical transmittance through a patterned region of a touch sensing layer, thereby enhancing the image quality.

MODE FOR THE INVENTION

Figure 1:
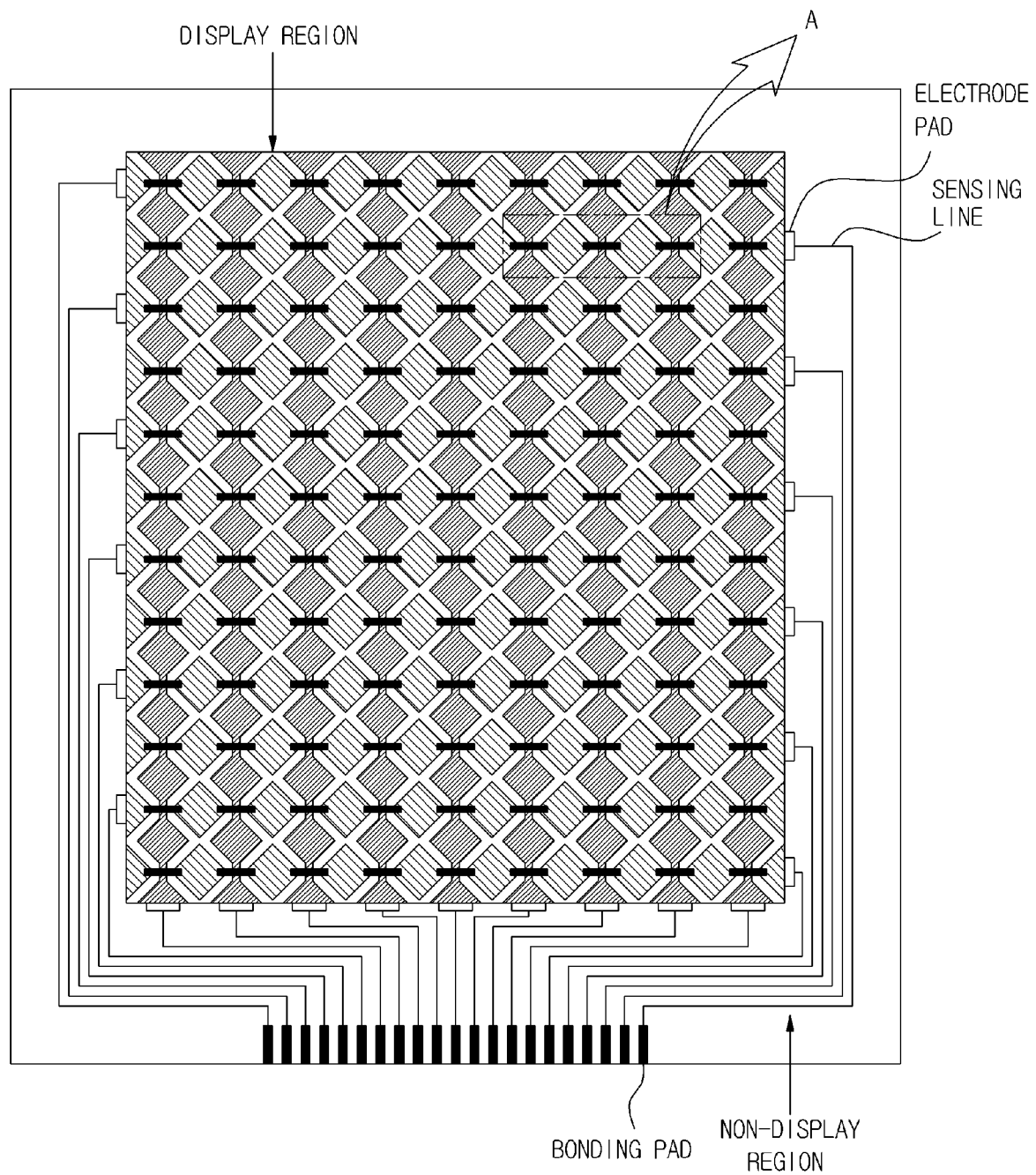
FIG. 1 is a schematic diagram illustrating the overall planar shape of a film touch sensor according to the exemplary embodiments of the present invention.

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the invention to the particular forms disclosed, but, on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a preferred exemplary embodiment of the present invention will be described in detail with reference to the accompanying drawings.

FIG. 1 is a schematic diagram illustrating the overall planar shape of a film touch sensor according to the exemplary embodiments of the present invention.

Referring to FIG. 1, a film touch sensor according to the exemplary embodiments of the present invention can be divided into a display region and a non-display region based on whether the visual information is displayed or not.

In FIG. 1, in order to enhance the recognizability of the elements provided in the non-display region, the non-display region is illustrated enlarged from the actual size.

The display region is a region where the images provided by the devices coupled to the film touch sensor are displayed, and at the same time, it is a region for sensing touch signals inputted from a user by a capacitive method, and in this display region, the elements comprising a plurality of sensing patterns formed in the crossed direction are formed.

In the non-display region located in the periphery of the display region, electrode pads electrically connected to the sensing patterns, sensing lines electrically connected to the electrode pads, and bonding pads electrically connected to the sensing lines are formed. A flexible printed circuit (FPC) which transfers touch signals detected in the display region to the driving unit, which is not shown, is connected to the bonding pads.

Figure 2:
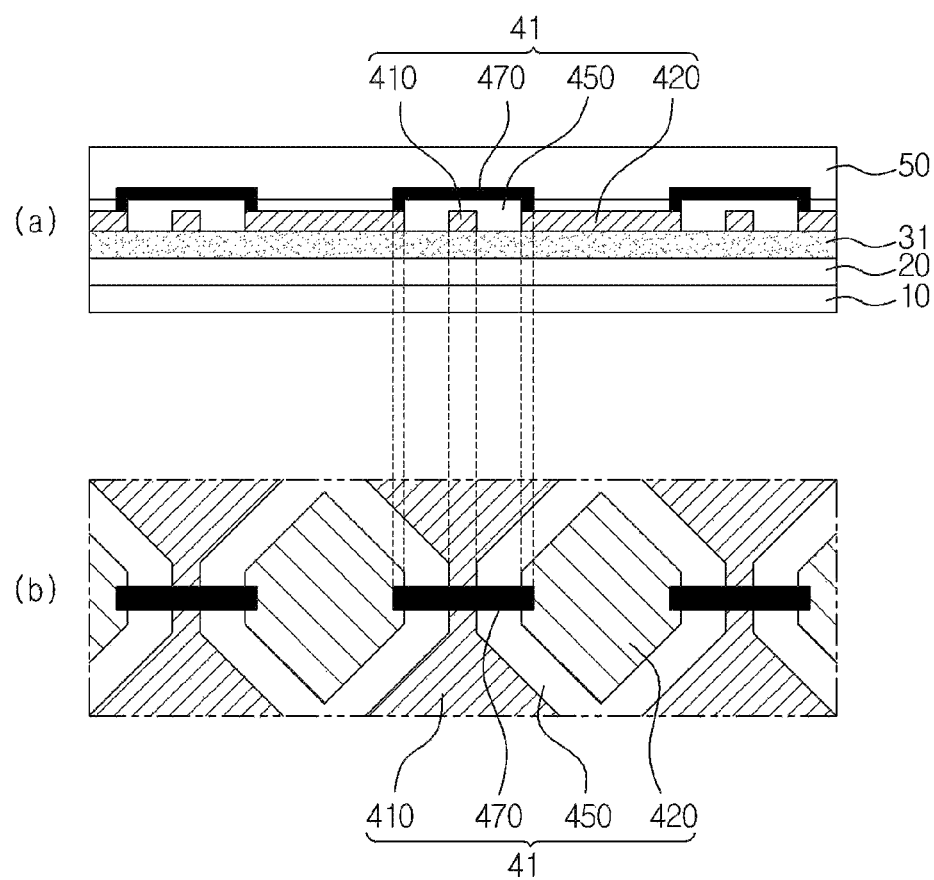
FIG. 2 is a cross-sectional view and a plan view of a portion of the elements according to the first exemplary embodiment of the present invention.

FIG. 2 is a cross-sectional view and a plan view of a portion of the elements according to the first exemplary embodiment of the present invention. That is, part (a) of FIG. 2 is a cross-sectional view of a film touch sensor according to the first exemplary embodiment of the present invention, and part (b) of FIG. 2 is a plan view of the portions of the elements.

Referring to FIG. 2, a film touch sensor according to the first exemplary embodiment of the present invention comprises: a separation layer 10, a first protection layer 20, an optical compensation layer 31, a touch sensing layer 41 and a second protection layer 50.

The separation layer 10 is a layer formed for peeling from the carrier substrate of a hard material such as a glass and the like in the manufacturing a film touch sensor according to the first exemplary embodiment of the present invention. Though it will be described later, the separation layer 10 can also perform the function of sheathing and insulating the touch sensing layer 41 formed in the upper side by surrounding thereof.

When the requirement of providing a certain level of peel strength and transparency is satisfied, materials of the separation layer 10 are not particularly limited. For example, a separation layer 10 may be made of polymers such as a polyimide, a polyvinyl alcohol, a polyamic acid, a polyamide, a polyethylene, a polystyrene, a polynorbornene, a phenylmaleimide copolymer, a polyazobenzene, a polyphenylenephthalamide, a polyester polymer, a polymethyl methacrylate, a polyarylate, a cinnamate, a phthalimidine, a chalcone, an aromatic acetylene and the like, and they may be used alone or in combination of at least two.

Although the peel strength of the separating layer 10 is not limited specifically, for example, it may be equal or greater than 0.011N/25 mm and equal or less than 1N/25 mm, but preferably, may be equal or greater than 0.01N/25 mm equal or less than 0.1N/25 mm. When the above mentioned range is satisfied, the peeling from the carrier substrate can be easily accomplished without residues during the manufacturing process of a touch sensor.

Although the thickness of the separating layer 10 is not limited specifically, for example, it could be 10 to 1,000 nm, but preferably, could be 50 to 500 nm. When the above range is satisfied, the peel strength is stabilized and the patterns can be formed uniformly.

The first protection layer 20 is formed between the separation layer 10 and the touch sensing layer 41, and is an optional element that can be omitted as necessary. The first protection layer 20 together with the separation layer 10 sheathes and protects the touch sensing layer 41 together with the separation layer 10, and performs a function of preventing the separation layer 10 from being exposed to the etchant which is used for forming the touch sensing layer 41 during the manufacturing process of a touch sensor according to the first exemplary embodiment of the present invention.

As for the material of the first protection layer 20, a polymer publicly known to the art may be used without limitation, for example, an organic insulation membrane may be applied, and above all, it may be a material formed of a hardening composite containing a polyol and a melamine curing agents, but not limited to these.

As for the specific types of polyol, polyether glycol derivatives, polyester glycol derivatives, polycaprolactone glycol derivatives, and the like can be taken as examples, but not limited to these examples.

As for the specific types of melamine curing agent, methoxy methyl melamine derivatives, methyl melamine derivatives, butyl melamine derivatives, isobutoxy melamine derivatives, butoxy melamine derivatives, and the like can be taken as examples thereof, but not limited to these examples.

As for other example, the protection layer 20 can be formed with organo-inorgano hybrid curable composites, and using both organic compound and inorganic compound is desirable in that the cracks occurring while peeling off can be reduced.

As for an organic compound, the above described components can be used, and as for an inorganic material, silica based nano particles, silicon based nano particles, glass nano fibers, and the like can be taken as examples thereof, but not limited to these examples.

The optical compensation layer 31 is formed on the first protection layer 20, and performs the function of compensating the difference in the transmittance between the patterned region formed with a transparent electrode pattern constituting the touch sensing layer 41 and the non-patterned region not formed with a transparent electrode pattern.

This will be described in detail as follows.

Referring to part (a) of FIG. 2 showing the cross-sectional view of a film touch sensor according to the first exemplary embodiment of the present invention, and part (b) of FIG. 2 illustrating the elements of the touch sensing layer 41 corresponding to the cross-sectional view, the film touch sensor can be divided into a patterned region and a non-patterned region according to the stacking structure along the up-down direction.

If the optical compensation layer 31 is not interposed, the non-patterned region has a structure stacked with a separation layer 10, a first protection layer 20 and a second protection layer 50, and the patterned region has a structure stacked not only with a separation layer 10, a first protection layer 20 and a second protection layer 50, but also additionally with a first transparent electrode pattern 410 or a second transparent electrode pattern 420 or a bridge pattern 470. As disclosed in part (b) of FIG. 2, the non-patterned region is the separated region between the first transparent electrode pattern 410 and the second transparent electrode pattern 420, and the patterned region is the region excluding the non-patterned region. The difference in the stacking structures of the non-patterned region and the patterned region causes difference in the transmittance of the light passing through these regions, and due to such a difference in the transmittance of the light a problem occurs in that the patterned region and the non-patterned region are distinguishably recognized.

On the contrary, according to the first exemplary embodiment of the present invention, when an optical compensation layer 31 is interposed between the first protection layer 20 and the touch sensing layer 41, the difference in the transmittance between the patterned region and the non-patterned region is compensated by the optical compensation layer 31 therefore the patterned region and the non-patterned region may be recognized but not distinguishable for a user.

For example, as a means for appropriately compensating the difference in the optical transmittance caused by the difference in the transmittance between the patterned region and the non-patterned region, more specifically, the difference between the refractive indices in these regions, considering that the thickness of the material located in the pathway of the propagating light affects the transmittance, when the thickness of the patterned region is from 300 Å to 600 Å, the thickness ratio between the patterned region and the optical compensation layer 31 (thickness of the patterned region/thickness of the optical compensation layer) can be set up from 0.3 to 0.8, and when the thickness of the patterned region is from 1100 Å to 1500 Å, the thickness ratio between the optical compensation layer 31 and the patterned region (thickness of the optical compensation layer 31/thickness of the patterned region) can be set up from 0.07 to 0.7.

For example, the refractive index of the optical compensation layer 31 is configured to be greater than the first protection layer 20 and equal or less than the refractive index of the transparent electrode pattern constituting the touch sensing layer 41, and for a specific example, the refractive index of the optical compensation layer 31 may be configured to be equal or greater than 1.6 and equal or less than 2.1, and more preferably can be configured to be equal or greater than 1.6 and equal or less than 1.9. When configured in this way, the optical compensation layer 31 interposed between the first protection layer 20 and the touch sensing layer 41 has a refractive index between the refractive index of the first protection layer 20 and the refractive index of the touch sensing layer 41, therefore the optical loss due to the abrupt difference in the refractive indexes between the first protection layer 20 and the touch sensing layer 41 can be prevented. When the refractive index is less than 1.6, the transmittance of the non-patterned region is increased therefore there is problem in that the recognizability is increased. When the refractive index exceeds 2.1, the transmittance of the non-patterned region is decreased therefore there is problem in that the recognizability is increased. In addition, the thickness of the optical compensation layer 31 is too thin so that there is a problem of occurring difficulty in controlling the thickness uniformity during the film forming process.

The following Tables 1 to 4 are the test results of recognizability of the transparent electrode pattern according to the thickness and the refractive index of the optical compensation layer, and the test results about the transmittance of the patterned region wherein the transparent electrode pattern is formed.

In this test, a test specimen of a transparent electrode having a patterned region was prepared by forming a separation layer with cinnamate on a 700 μm thick glass substrate, a protection layer with polyolefin on the separation layer, an optical compensation layer on the protection layer, and an electrode pattern was formed with ITO on the optical compensation layer. Later, a second protection layer of polyolefin resin was formed.

A test specimen of a transparent electrode having a non-patterned region was prepared in the same way as the test specimen of a transparent electrode having the patterned region except the forming process of the electrode pattern layer with ITO.

The optical compensation layer was formed on the test specimen having a patterned region and a non-patterned region in a way that only the optical compensation layer was formed on a glass by adding $ZrO_2$ inorganic particles of 10 nm diameter into polyolefin so that the thickness and the refractive index of the optical compensation layer to have the thickness and the refractive index in Table 1 when measured by a thickness and refractive index measurement meter for thin film, ST400-DLX (K-Mac Co.).

The following Table 1 shows the test result of the recognizability for a transparent electrode pattern according to the thickness and the refractive index of the optical compensation layer when the thickness of the transparent electrode pattern is 450 Å. The test result of the recognizability is expressed in values of difference in the transmittance between the patterned region and the non-patterned region after separate measurements thereof. The unit is percent. The measurement apparatus was CM3700D (Konica-Minolta Co.) and as for the transmittance, the transmittance and visibility was measured at standard illuminant D65.

TABLE 1

| Thickness of optical compensation layer (Å) | Refractive index of optical compensation layer | | | | | |
|---|---|---|---|---|---|---|
| | 1.67 | 1.7 | 1.75 | 1.82 | 1.9 | 2.1 |
| 0 | 1.1 | 1.1 | 1.1 | 1.1 | 1.1 | 1.1 |
| 100 | 1.3 | 1.3 | 1.3 | 1.4 | 1.5 | 1.7 |
| 200 | 1.3 | 1.3 | 1.4 | 1.4 | 1.5 | 1.6 |
| 400 | 1.0 | 1.0 | 0.9 | 0.7 | 0.4 | 0.4 |
| 600 | 0.5 | 0.3 | 0.1 | 0.6 | 1.2 | 2.9 |
| 800 | 0.1 | 0.4 | 0.9 | 1.6 | 2.4 | 4.0 |
| 1000 | 0.2 | 0.5 | 1.0 | 1.7 | 2.2 | 2.9 |
| 1200 | 0.0 | 0.2 | 0.5 | 0.8 | 0.9 | 0.4 |
| 1400 | 0.5 | 0.5 | 0.4 | 0.4 | 0.6 | 1.2 |

The following Table 2 shows the test result of the transmittance of the patterned region wherein the transparent electrode pattern is formed according to the thickness and the refractive index of the optical compensation layer when the thickness of the transparent electrode pattern is 450 Å.

TABLE 2

| Thickness of optical compensation layer (Å) | Refractive index of optical compensation layer | | | | | |
|---|---|---|---|---|---|---|
| | 1.67 | 1.7 | 1.75 | 1.82 | 1.9 | 2.1 |
| 0 | 91.2 | 91.2 | 91.2 | 91.2 | 91.2 | 91.2 |
| 100 | 91.1 | 91.0 | 90.9 | 90.8 | 90.6 | 90.1 |
| 200 | 91.0 | 90.9 | 90.7 | 90.5 | 90.1 | 88.9 |
| 400 | 91.0 | 90.9 | 90.7 | 90.2 | 89.5 | 87.1 |
| 600 | 91.3 | 91.2 | 91.0 | 90.5 | 89.8 | 87.1 |
| 800 | 91.7 | 91.7 | 91.6 | 91.3 | 90.8 | 89.0 |
| 1000 | 91.9 | 92.0 | 92.0 | 91.9 | 91.7 | 91.1 |
| 1200 | 91.9 | 92.0 | 92.1 | 92.1 | 92.0 | 91.6 |
| 1400 | 91.7 | 91.7 | 91.7 | 91.6 | 91.4 | 90.3 |

Referring to Tables 1 and 2, under the condition wherein the thickness of the transparent electrode pattern is 450 Å and the refractive index of the optical compensation layer is from 1.6 to 2.1, more preferably from 1.6 to 1.9, and when considering both of the recognizability for the transparent electrode pattern and the transmittance of the patterned region at the same time, it is desirable that the optical compensation layer has a thickness from 600 Å to 1400 Å, and in this case, the thickness ratio between the patterned region and the optical compensation layer (thickness of patterned region/thickness of optical compensation layer) becomes from 0.3 to 0.8.

The following Table 3 shows the test result of the recognizability for the transparent electrode pattern according to the thickness and the refractive index of the optical compensation layer when the thickness of the transparent electrode pattern is 1150 Å.

TABLE 3

| Thickness of optical compensation layer (Å) | Refractive index of optical compensation layer | | | | | |
|---|---|---|---|---|---|---|
| | 1.67 | 1.7 | 1.75 | 1.82 | 1.9 | 2.1 |
| 0 | 2.1 | 2.1 | 2.1 | 2.1 | 2.1 | 2.1 |
| 85 | 2.0 | 2.0 | 1.9 | 1.8 | 1.6 | 1.2 |
| 100 | 1.8 | 1.7 | 1.6 | 1.4 | 1.2 | 0.6 |
| 200 | 1.5 | 1.3 | 1.1 | 0.6 | 0.2 | 1.0 |
| 400 | 0.94 | 0.65 | 0.17 | 0.54 | 1.27 | 3.01 |
| 600 | 0.7 | 0.4 | 0.1 | 0.7 | 1.3 | 2.4 |
| 800 | 1.0 | 0.8 | 0.5 | 0.1 | 0.1 | 0.0 |
| 1000 | 1.5 | 1.5 | 1.4 | 1.5 | 1.6 | 2.4 |
| 1200 | 2.1 | 2.1 | 2.3 | 2.5 | 2.7 | 3.1 |
| 1400 | 2.4 | 1.5 | 2.5 | 2.6 | 2.5 | 1.3 |

The following Table 4 shows the test result of the transmittance for the patterned region wherein the transparent electrode pattern is formed according to the thickness and the refractive index of the optical compensation layer when the thickness of the transparent electrode pattern is 1150 Å.

TABLE 4

| Thickness of optical compensation layer (Å) | Refractive index of optical compensation layer | | | | | |
|---|---|---|---|---|---|---|
| | 1.67 | 1.7 | 1.75 | 1.82 | 1.9 | 2.1 |
| 0 | 90.3 | 90.3 | 90.3 | 90.3 | 90.3 | 90.3 |
| 85 | 90.4 | 90.4 | 90.5 | 90.6 | 90.7 | 90.8 |
| 100 | 90.5 | 90.6 | 90.7 | 90.8 | 91.0 | 91.3 |
| 200 | 90.8 | 90.9 | 91.0 | 91.2 | 91.4 | 91.5 |
| 400 | 91.06 | 91.19 | 91.34 | 91.39 | 91.22 | 89.66 |

TABLE 4-continued

| Thickness of optical compensation layer (Å) | Refractive index of optical compensation layer | | | | | |
|---|---|---|---|---|---|---|
| | 1.67 | 1.7 | 1.75 | 1.82 | 1.9 | 2.1 |
| 600 | 91.0 | 91.1 | 91.0 | 90.6 | 89.9 | 86.6 |
| 800 | 90.6 | 90.6 | 90.3 | 89.5 | 88.5 | 85.0 |
| 1000 | 90.2 | 90.0 | 89.6 | 88.8 | 87.9 | 85.8 |
| 1200 | 89.8 | 89.6 | 89.3 | 88.8 | 88.4 | 88.2 |
| 1400 | 89.8 | 89.7 | 89.5 | 89.5 | 89.5 | 90.2 |

Referring to Tables 3 and 4, under the condition wherein the thickness of the transparent electrode pattern is 1150 Å and the refractive index of the optical compensation layer is from 1.6 to 2.1, more preferably from 1.6 to 1.9, and when considering both of the recognizability for the transparent electrode pattern and the transmittance of the patterned region at the same time, it is desirable that the optical compensation layer has a thickness from 85 Å to 800 Å, and in this case, the thickness ratio between the optical compensation layer and the patterned region (thickness of optical compensation layer/thickness of patterned region) becomes from 0.07 to 0.7.

As for an example, the optical compensation layer 31 may be configured to comprise an inorganic insulating membrane, and as for a specific example, it may be configured to comprise at least one selected from the group comprising $Al_2O_3$, MgO, $NdF_3$, $SiO_N$, $Y_2O_3$, ZnO, $TiO_2$, $ZrO_2$ and $Nb_2O_5$.

As for another example, the optical compensation layer 31 may be configured to comprise an organic insulating membrane, and as for a specific example, it may be configured to comprise an organic material containing inorganic particles.

When the optical compensation layer 31 is configured to comprise an organic material containing fine inorganic particles, for example, the content of the inorganic fine particles may be configured to be equal or greater than 40 wt % but equal or less than 95 wt % with respect to the total weight of the optical compensation layer 31. If the content of the inorganic fine particles is equal or less than 40 wt %, there is a problem in that the thickness of the membrane must be thicker in order to realize same refractive index, and due to the increase in the amount of organic material the crack may occur when bending, that is, when the touch sensor is being bent. If the content of the inorganic fine particles is equal or greater than 95 wt %, there is a problem in that the amount of organic material capable of binding the fine particles is small therefore the adhering force with the elements locating in the upper and the lower sides of the optical compensation layer 31 becomes lower.

When the optical compensation layer 31 is configured to comprise an organic material containing inorganic fine particles, for example, the organic material may comprise at least one selected from the group comprising acrylic resin, urethane resin, melamine resin, alkyd resin, siloxane polymer, organic silane condensate, but not limited to these.

When the optical compensation layer 31 is configured to comprise an organic material containing inorganic fine particles, the inorganic particles may be configured to comprise at least one selected from the group comprising $Al_2O_3$, MgO, $NdF_3$, $SiO_N$, $Y_2O_3$, ZnO, $TiO_2$, $ZrO_2$ and $Nb_2O_5$, but not limited to these.

When the optical compensation layer 31 is configured to comprise organic material containing inorganic fine particles, for example, it may be configured to adjust the refractive index of the optical compensation layer 31 by controlling the amount of the content of the inorganic fine particles. For example, the refractive index of the optical compensation layer 31 is increased by increasing the amount of the content of the inorganic fine particles, and, on the contrary, the refractive index of the optical compensation layer 31 is decreased by decreasing the amount of the content of the inorganic fine particles.

When the optical compensation layer 31 is configured to comprise organic material containing inorganic fine particles, for example, the average diameter of the distributed inorganic particle may be configured to be equal or greater than 10 nm but equal or less than 200 nm.

The touch sensing layer 41 is formed on the optical compensation layer 31, and it is an element for detecting touch signals inputted by a user.

For example, the sensing patterns constituting the touch sensing layer 41 may be formed in an appropriate shape according to the requirement of the electronic apparatus to which it is applied, for example, when it is applied to a touch screen panel, it may be formed with two types of patterns, that are, a pattern for detecting x-coordinates and a pattern for detecting y-coordinates, but not limited to these.

For example, the touch sensing layer 41 may comprise a first transparent electrode pattern 410, a second transparent electrode pattern 420, an insulating portion 450 and a bridge pattern 470.

The first transparent electrode pattern 410 is formed along a first direction as being electrically connected to each other; the second transparent electrode pattern 420 is formed along a second direction as being separated from each other; and the second direction is crossed with the first direction. For example, if the first direction is X-direction, the second direction may be Y-direction.

The insulating portion 450 is formed between the first transparent electrode pattern 410 and the second transparent electrode pattern 420, and electrically connects the first transparent electrode pattern 410 and the second transparent electrode pattern 420. More specifically, the insulating portion 450 is formed on the entire surface of the first transparent electrode pattern 410, the second transparent electrode pattern 420 and the optical compensation layer 31, and contact holes for exposing a portion of the second sensing electrode pattern are formed in the insulating portion 450.

The bridge pattern 470 is formed on the insulating portion 450 between the contact holes formed on the insulating portion 450, and connects the adjacent second sensing electrode patterns 420.

As for the first transparent electrode pattern 410, the second transparent electrode pattern 420, and the bridge pattern 470, any transparent conductive material can be used without limitation, for example, it can be formed with materials selected from: metal oxides selected from the group comprising indium tin oxide (ITO), indium zinc oxide (IZO), indium zinc tin oxide (IZTO), aluminum zinc oxide (AZO), gallium zinc oxide (GZO), fluorine tin oxide (FTO), indium tin oxide-Ag-indium tin oxide (ITO-Ag-ITO), indium zinc oxide-Ag-indium zinc oxide (IZO-Ag-IZO), indium zinc tin oxide-Ag-indium zinc tin oxide (IZTO-Ag-IZTO), and aluminum zinc oxide-Ag-aluminum zinc oxide (AZO-Ag-AZO); metals selected from the group comprising gold (Au), silver (Ag), molybdenum (Mo), and APC; nano wires made of metal selected from the group comprising gold, silver, copper, and lead; carbon based materials selected from the group comprising carbon nano tube (CNT) and grapheme; and conductive polymer materials selected from the group comprising poly(3,4-ethylenedioxitiophene) (PEDOT) and polyaniline (PANI), and these can be used individually or in a mixture of more than two of them, and preferably, indium tin oxide may be used. Both a crystalline and a non-crystalline indium tin oxide are usable.

The thickness of the touch sensing layer 41 is not specifically limited; however, if possible, a thin film is preferred considering the flexibility of touch sensors.

For example, the first transparent electrode pattern 410 and the second transparent electrode pattern 420 which constitute the touch sensing layer 41 are mutually independent and may be polygonal patterns like triangles, rectangles, pentagons, hexagons, heptagons and more.

In addition, for example, the touch sensing layer 41 may comprise a regular pattern. The regular pattern means that the shape of the pattern possesses regularity. For example, the sensing patterns, mutually independent, may comprise a mesh-like shape such as rectangles or squares, or a pattern comprised of hexagons.

Also, for example, the sensing layer 41 may include an irregular pattern. An irregular pattern means that the shape of the pattern contains irregularity therein.

Also, for example, when the sensing patterns constituting the touch sensing layer 41 are formed with metal nano wires, carbon based materials, polymer based materials, and the like; the sensing patterns may have a network type structure. When the sensing patterns have a network type structure a pattern having a high sensitivity can be implemented because signals are sequentially transferred to the patterns mutually contacted and adjacent.

For example, the sensing patterns constituting the touch sensing layer 41 may be formed with a single layer or multiple layers.

As for a material of the insulating portion 450 for insulating the first transparent electrode pattern 410 and the second transparent electrode pattern 420, any insulating material known to the art may be used without limitation, for example, metal oxides such as silicon based oxides, photosensitive resin composites containing metal oxides or acrylic resins, or thermoplastic resin composites may be used. Or, the insulating portion 450 may be formed using inorganic materials such as silicon oxides (SiOx), and in this case, they can be formed using methods such as vacuum evaporation, sputtering, and the like.

The second protection layer 50 is formed of an insulating material, and formed to cover the first transparent electrode pattern 410, the second transparent electrode pattern 420, the insulating portion 450 and the bridge pattern 470 which are constituting the touch sensing layer 41, so that it performs the function of insulating and protecting the touch sensing layer 41 from the outside.

For example, the second protection layer 50 may be formed in a way that the opposite surface of the surface which is contacting with the touch sensing layer 41 is planarized.

In addition, for example, the second protection layer 50 may be formed with a single layer or multiple layers more than two layers.

In addition, for example, as for a material of the second insulating layer 50, any insulating material known to the art may be used without limitation, for example, metal oxides such as silicon based oxides, photosensitive resin composites containing metal oxides or acrylic resins, or thermoplastic resin composites may be used.

Figure 3:
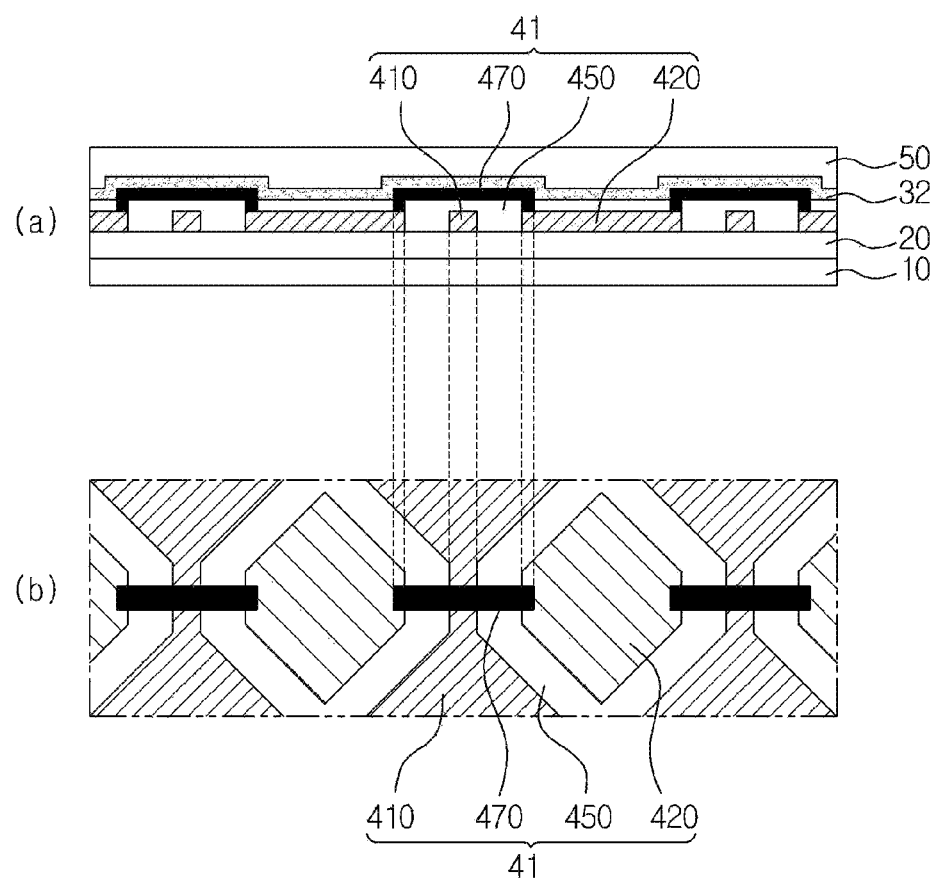
FIG. 3 is a cross-sectional view and a plan view of a portion of the elements according to the second exemplary embodiment of the present invention.

FIG. 3 is a cross-sectional view and a plan view of a portion of the elements according to the second exemplary embodiment of the present invention.

That is, part (a) of FIG. 3 is a cross-sectional view of a film touch sensor according to the second exemplary embodiment of the present invention, and part (b) of FIG. 3 is a plan view of the portions of the elements.

Referring to FIG. 3, a film touch sensor according to the second exemplary embodiment of the present invention comprises a separation layer 10, a first protection layer 20, an optical compensation layer 32, a touch sensing layer 45 and a second protection layer 50. Hereinafter, in order to avoid duplication of explanation, the second exemplary embodiment will be described with focus on the difference in the second exemplary embodiment as compared with the first exemplary embodiment.

Unlike the first exemplary embodiment previously described in detail, according to the second exemplary embodiment, an optical compensation layer 32 is formed on a touch sensing layer 41, and the touch sensing layer 41 is formed on a first protection layer 20.

Figure 4:
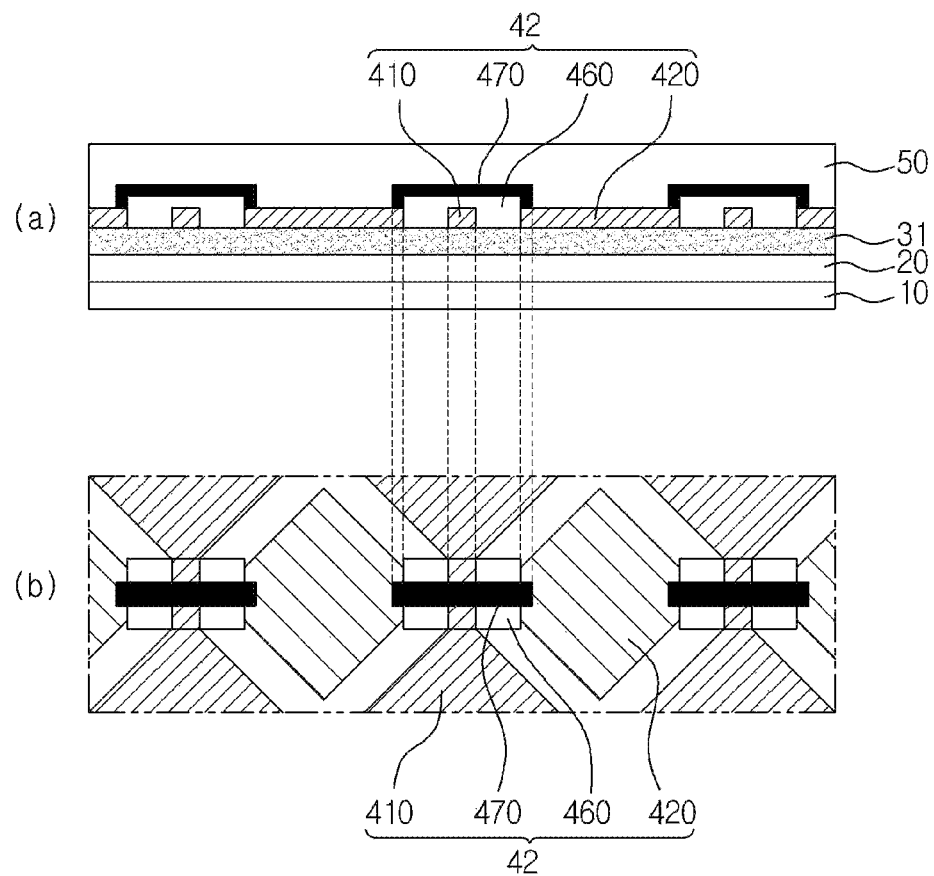
FIG. 4 is a cross-sectional view and a plan view of a portion of the elements according to the third exemplary embodiment of the present invention.

FIG. 4 is a cross-sectional view and a plan view of a portion of the elements according to the third exemplary embodiment of the present invention. That is, part (a) of FIG. 4 is a cross-sectional view of a film touch sensor according to the third exemplary embodiment of the present invention, and part (b) of FIG. 4 is a plan view of the portions of the elements.

Referring to FIG. 4, a film touch sensor according to the third exemplary embodiment of the present invention comprises a separation layer 10, a first protection layer 20, an optical compensation layer 31, a touch sensing layer 42 and a second protection layer 50. Hereinafter, in order to avoid duplication of explanation, the third exemplary embodiment will be described with focus on the difference in the third exemplary embodiment as compared with the first exemplary embodiment.

The third exemplary embodiment is different from the first exemplary embodiment in the structure of the touch sensing layer 42.

According to the third exemplary embodiment, an insulating portion 460 is formed on the entire surface of a first transparent electrode pattern 410 and on the optical compensation layer 31 which is exposed between the first transparent electrode pattern 410 and a second transparent electrode pattern 420. That is, according to the third exemplary embodiment, The insulating portion 460 is formed in the vicinity of a region where the first transparent electrode pattern 410 and the second transparent electrode pattern 420 are crossing, and has the shape of, for example, an island. A bridge pattern 470 is formed on the insulating portion 460 having the shape of, for example, an island, in a way that it is contacted to the adjacent second transparent electrode patterns 420.

Figure 5:
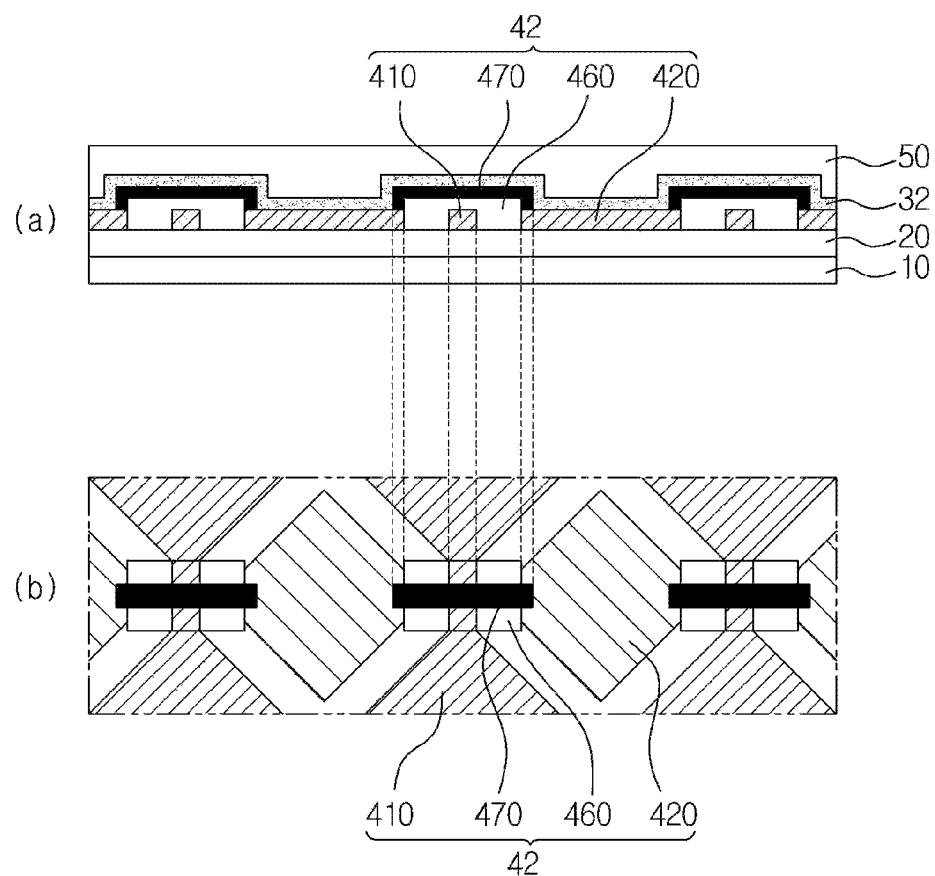
FIG. 5 is a cross-sectional view and a plan view of a portion of the elements according to the fourth exemplary embodiment of the present invention.

FIG. 5 is a cross-sectional view and a plan view of a portion of the elements according to the fourth exemplary embodiment of the present invention. That is, part (a) of FIG. 5 is a cross-sectional view of a film touch sensor according to the fourth exemplary embodiment of the present invention, and part (b) of FIG. 5 is a plan view of the portions of the elements.

Referring to FIG. 5, a film touch sensor according to the fourth exemplary embodiment of the present invention comprises a separation layer 10, a first protection layer 20, an optical compensation layer 32, a touch sensing layer 42 and a second protection layer 50. Hereinafter, in order to avoid duplication of explanation, the fourth exemplary embodiment will be described with focus on the difference in the fourth exemplary embodiment as compared with the third exemplary embodiment.

Unlike the third exemplary embodiment, according to the fourth exemplary embodiment, the optical compensation layer 32 is formed on the touch sensing layer 42, and the touch sensing layer 42 is formed on the first protection layer 20.

Figure 6:
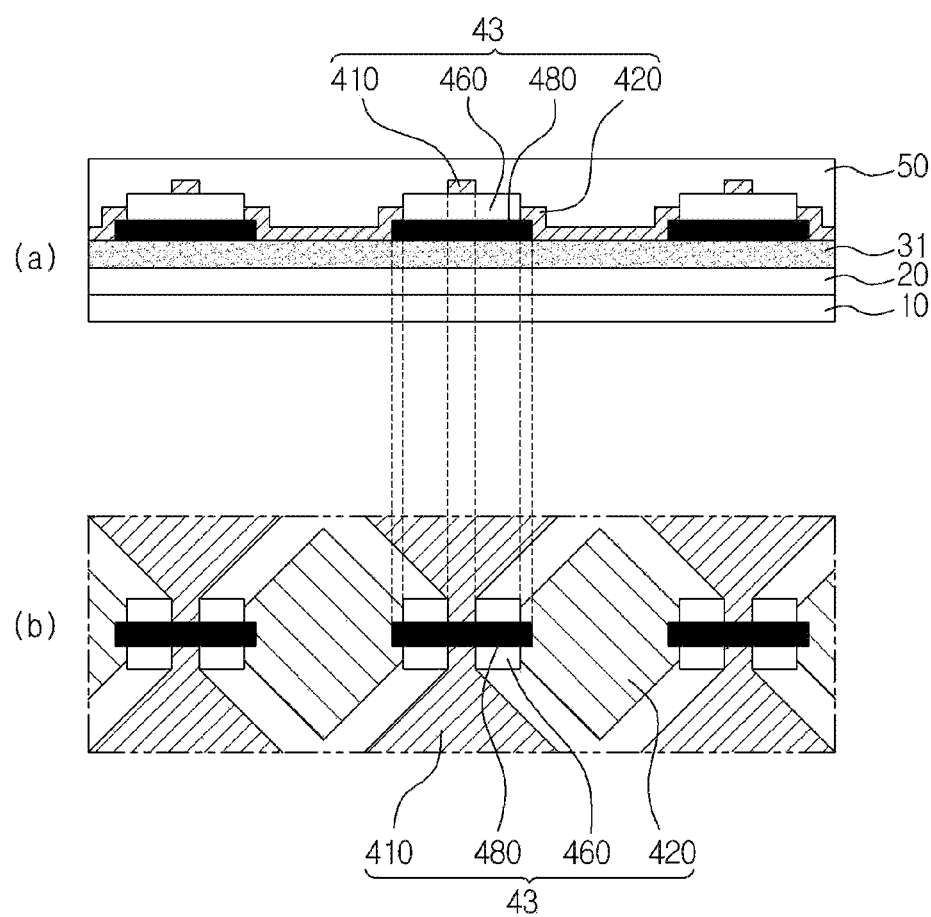
FIG. 6 is a cross-sectional view and a plan view of a portion of the elements according to the fifth exemplary embodiment of the present invention.

FIG. 6 is a cross-sectional view and a plan view of a portion of the elements according to the fifth exemplary embodiment of the present invention. That is, part (a) of FIG. 6 is a cross-sectional view of a film touch sensor according to the fifth exemplary embodiment of the present invention, and part (b) of FIG. 6 is a plan view of the portions of the elements.

Referring to FIG. 6, a film touch sensor according to the fourth exemplary embodiment of the present invention comprises a separation layer 10, a first protection layer 20, an optical compensation layer 31, a touch sensing layer 43 and a second protection layer 50. Hereinafter, in order to avoid duplication of explanation, the fifth exemplary embodiment will be described with focus on the difference in the fifth exemplary embodiment as compared with the first exemplary embodiment.

The fifth exemplary embodiment is different from the first exemplary embodiment in the structure of the touch sensing layer 43. That is, according to the first exemplary embodiment, it has a so-called 'top bridge' structure wherein the bridge pattern 470 constituting the touch sensing layer 41 is formed on the upper side of the insulating portion 450, however, according to the fifth exemplary embodiment, it has a so-called 'bottom bridge' structure wherein a bridge pattern 480 constituting the touch sensing layer 43 is formed on the lower side of an insulating portion 460.

More specifically, according to the fifth exemplary embodiment, the bridge pattern 480 constituting the touch sensing layer 43 is formed on the optical compensation layer 31, and the adjacent transparent electrode patterns 420 are electrically connected with the bridge pattern 480 as an intermediate.

The insulating portion 460 is formed on the bridge pattern 480 so that portions of, that is, the edge regions of the both sides of the bridge pattern 480 are exposed.

The first transparent electrode pattern 410 is formed on the insulating portion 460 along a first direction so as to be connected to each other.

The transparent electrode pattern 420 is formed on the exposed regions of the bridge pattern 480 and optical compensation layer 31 along a second direction crossed with the first direction.

Figure 7:
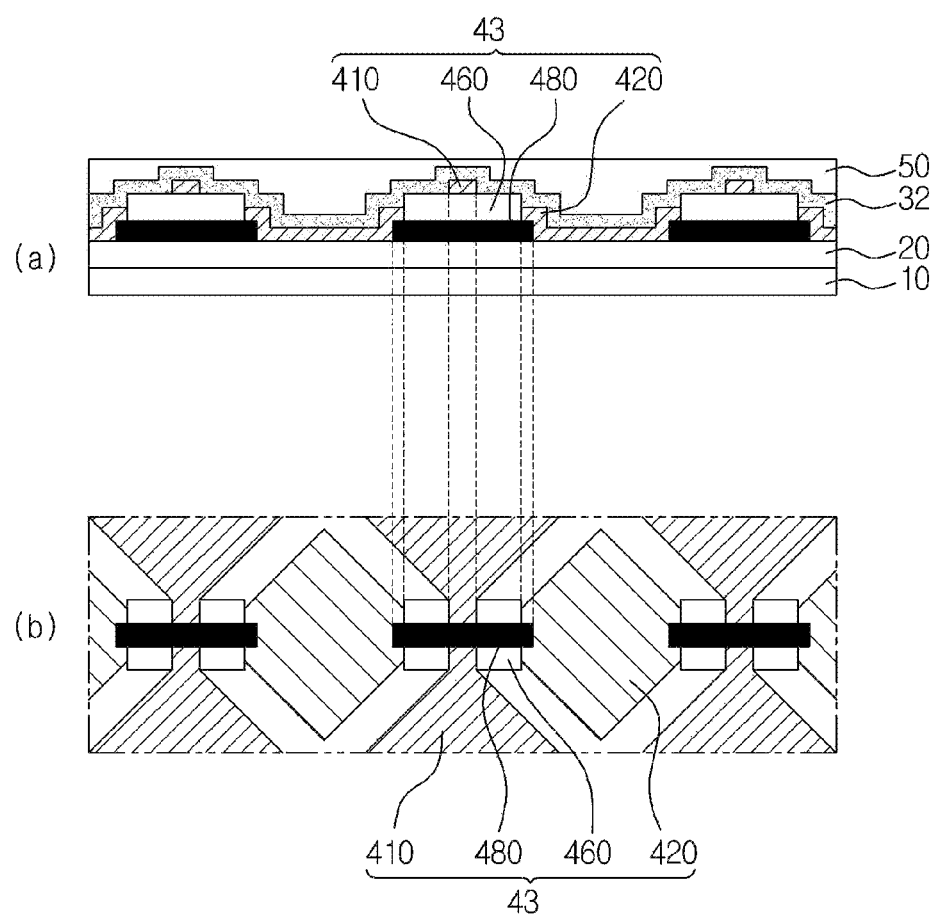
FIG. 7 is a cross-sectional view and a plan view of a portion of the elements according to the sixth exemplary embodiment of the present invention.

FIG. 7 is a cross-sectional view and a plan view of a portion of the elements according to the sixth exemplary embodiment of the present invention. That is, part (a) of FIG. 7 is a cross-sectional view of a film touch sensor according to the sixth exemplary embodiment of the present invention, and part (b) of FIG. 7 is a plan view of the portions of the elements.

Referring to FIG. 7, a film touch sensor according to the sixth exemplary embodiment of the present invention comprises a separation layer 10, a first protection layer 20, an optical compensation layer 32, a touch sensing layer 43 and a second protection layer 50. Hereinafter, in order to avoid duplication of explanation, the sixth exemplary embodiment will be described with focus on the difference in the sixth exemplary embodiment as compared with the fifth exemplary embodiment.

Unlike the fifth exemplary embodiment, according to the sixth exemplary embodiment, the optical compensation layer 32 is formed on the touch sensing layer 43, and the touch sensing layer 43 is formed on the first protection layer 20.

As described in detail above, according to the present invention, there is an effect of providing a film touch sensor capable of compensating the difference in the transmittance between a patterned region and a non-patterned region which constitute a touch sensing layer so as to prevent a phenomenon wherein the patterned region and the non-patterned region are distinguishably recognized.

In addition, there is an effect of providing a film touch sensor capable of enhancing the optical transmittance through a patterned region of a touch sensing layer, thereby enhancing the image quality.

A. (DESCRIPTION OF SYMBOLS)

10: separation layer
20: first protection layer
31, 32: optical compensation layer
41, 42, 43: touch sensing layer
50: second protection layer
410: first transparent electrode pattern
420: second transparent electrode pattern
450, 460: insulating portion
470, 480: bridge pattern

The invention claimed is:

1. A film touch sensor comprising:
   a separation layer formed for peeling from a carrier substrate in manufacturing a film touch sensor;
   a first protection layer formed on the separation layer;
   a touch sensing layer formed on the first protection layer;
   a second protection layer formed on the touch sensing layer; and
   an optical compensation layer formed between the first protection layer and the touch sensing layer or between the touch sensing layer and the second protection layer,
   wherein: a thickness of a patterned region is in the range of 300 Å to 550 Å, and a thickness ratio between the patterned region and the optical compensation layer (thickness of patterned region/thickness of optical compensation layer) is equal to or greater than 0.3 but equal to or less than 0.8; or a thickness of a pattered region is in the range of 1100 Å to 1500 Å, and a thickness ratio between the optical compensation layer and the patterned region (thickness of optical compensation layer/thickness of patterned region) is equal to or greater than 0.07 but equal or less than 0.7, and
   wherein the refractive index of the optical compensation layer is equal to or greater than 1.6 but equal to or less than 1.9.

2. The film touch sensor according to claim 1,
   wherein a refractive index of the optical compensation layer is greater than a refractive index of the first protection layer but equal to or less than a refractive index of a transparent electrode pattern.

3. The film touch sensor according to claim 1,
   wherein the optical compensation layer comprises an inorganic insulating membrane.

4. The film touch sensor according to claim 1,
   wherein the optical compensation layer comprises at least one selected from the group comprising $Al_2O_3$, MgO, $NdF_3$, $SiO_N$, $Y_2O_3$, ZnO, $TiO_2$, $ZrO_2$ and $Nb_2O_5$.

5. The film touch sensor according to claim 1,
   wherein the optical compensation layer comprises an organic insulating membrane.

6. The film touch sensor according to claim 1,
wherein the optical compensation layer comprises an organic material containing inorganic fine particles.

7. The film touch sensor according to claim 6,
wherein the content of the inorganic fine particles is equal to or greater than 40 wt % but equal or less than 95 wt % with respect to the total weight of the optical compensation layer.

8. The film touch sensor according to claim 6,
wherein the organic material comprises at least one selected from the group comprising acrylic resin, urethane resin, melamine resin, alkyd resin, siloxane polymer, and organic silane condensate.

9. The film touch sensor according to claim 6,
wherein the inorganic fine particles comprises at least one selected from the group comprising $Al_2O_3$, $MgO$, $NdF_3$, $SiO_N$, $Y_2O_3$, $ZnO$, $TiO_2$, $ZrO_2$ and $Nb_2O_5$.

10. The film touch sensor according to claim 6,
wherein the refractive index of the optical compensation layer is adjusted by controlling the content of the inorganic fine particles.

11. The film touch sensor according to claim 6,
wherein the average diameter of the distributed inorganic particle is equal to or greater than 10 nm but equal or less than 200 nm.

* * * * *